(12) United States Patent
Tanuma (10) Patent No.: US 6,205,526 B1
(45) Date of Patent: Mar. 20, 2001

(54) DEVICE AND METHOD FOR BACKING UP INTERNAL INFORMATION AND STORAGE MEDIUM HAVING INTERNAL INFORMATION BACKUP CONTROL PROGRAM STORED THEREON

(75) Inventor: Hiroyuki Tanuma, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/054,909

(22) Filed: Apr. 3, 1998

(30) Foreign Application Priority Data

Apr. 9, 1997 (JP) .................................................. 9-090403

(51) Int. Cl.$^7$ .................................................. G06F 12/16
(52) U.S. Cl. .............................. 711/162; 713/1; 717/11
(58) Field of Search .................................. 711/102, 103, 711/162, 161; 713/1, 100, 2; 714/6, 7, 20, 15, 21; 395/712; 717/11

(56) References Cited

U.S. PATENT DOCUMENTS

| | | | | |
|---|---|---|---|---|
| 5,450,589 | * | 9/1999 | Maebayashi et al. | 717/11 |
| 5,826,075 | * | 10/1998 | Bealkowski et al. | 713/187 |
| 5,860,121 | * | 1/1999 | Kapp | 711/162 |
| 5,864,698 | * | 1/1999 | Krau et al. | 713/2 |
| 5,878,256 | * | 3/1999 | Bealkowski et al. | 713/100 |
| 5,901,282 | * | 5/1999 | Tanuma | 714/15 |

FOREIGN PATENT DOCUMENTS 1-298421   12/1989   (JP) .

\* cited by examiner

Primary Examiner—Do Hyun Yoo
Assistant Examiner—Gary J. Portka
(74) Attorney, Agent, or Firm—Ostrolenk, Faber, Gerb & Soffen, LLP (57) ABSTRACT

The invention provides an internal information backing up device by which, even if the information is changed or the memory allocation is changed by a change in version of a firmware, the data structures of the information can be corrected automatically. When a firmware is started in which the form of backup data has been changed, a backup data expansion processing element expands all labels of data structures into a RAM using default values of a default value storage element, based on stored contents of a data structure table. The backup data expansion processing element compares a version of the data structure table of the firmware with a version of a data structure table in a non-volatile RAM. If these versions coincide with each other, the backup data expansion processing element expands the backup data of a backup data element into the RAM. But if the versions do not coincide, the backup data expansion processing element maintains the default value.

12 Claims, 5 Drawing Sheets

DEVICE AND METHOD FOR BACKING UP INTERNAL INFORMATION AND STORAGE MEDIUM HAVING INTERNAL INFORMATION BACKUP CONTROL PROGRAM STORED THEREON

BACKGROUND OF THE INVENTION

1. Field of the Invention

This invention relates to an internal information backing up device and method as well as a storage medium having an internal information backup control program stored thereon, and more particularly to a backup of information for operating a firmware in a device into which a firmware is incorporated.

2. Description of the Related Art

Conventionally, in a device, into which a firmware is incorporated, the backing up of the information for operation of the firmware has been performed using a binary data form (information set in device) equivalent to the information form in the device.

The information for operation of a firmware is backed up by expanding it into a RAM (random access memory) upon starting of the apparatus. The information is stored in the RAM in such a way that information having the same data structures is stored in each of the data structures.

In the conventional information backing up method as described above, since information is backed up in the form of binary data which is the same as the form of internal information of the device, when the information form is changed or the memory allocation is changed by a change in version of the firmware of the device side, the backed up data may not be usable any more.

SUMMARY OF THE INVENTION

Accordingly, it is an object of the present invention to provide an internal information backing up device and method as well as a storage medium having an internal information backup control program stored thereon, in which the problem described above can be eliminated and, even if the form of information is changed or the memory allocation is changed by a change in version of a firmware, the data structures of the information can be corrected automatically.

The above object of the invention can be attained by an internal information backing up device for backing up a plurality of information necessary for a firmware, which is incorporated in an electronic apparatus to control the operation of the electronic apparatus, which comprises a non-volatile storage medium including holding means for separately backing up the plurality of groups of information having the same data structures and data structure storage means for storing information representative of the data structures of each of the plurality of groups of information of the holding means and version information at least representative of order of production of the setting informations, a volatile storage medium for holding the plurality of groups of information having the same data structures, a data structure table disposed in the firmware for storing the information representative of the data structures of each of the plurality of groups of information and the version information representative at least of the order of production of the informations of the volatile storage medium, expansion means for expanding the data structures of each of the plurality of groups of information into the volatile storage medium based on the stored contents of the data structure table when the electronic apparatus is started, comparison means for comparing the version information stored in the data structure storage means of the non-volatile storage medium and the version information stored in the data structure table with each other for each of the plurality of information, and writing means for writing, after the expansion of the data structures of each of the plurality of groups of information into the volatile storage medium by the expansion means is completed, those of the setting information, in which coincidence is detected by the comparison means, into the volatile storage medium.

The above object of the invention can be attained also by an internal information backing up method for backing up a plurality of groups of information necessary for a firmware, which is incorporated in an electronic device and controls operation of the electronic device, comprising a step of expanding, upon starting of the electronic device, based on information representative of data structures of each of the plurality of groups of information stored in the firmware and version information at least representative of orders of production of the information, the data structures of each of the plurality of setting informations into a volatile storage medium for holding each of the plurality of groups of information each having the same data structures, a step of comparing version information stored in a non-volatile storage medium including a holding means for backing up the plurality of groups of information having the same data structures and a data structure storage means for storing information representative of the data structures of each of the plurality of groups of information of the holding means and version information at least representative of order of production of the information, the data structure storage means and the version information stored in the firmware for each of the plurality of groups of information, and a step of writing, after the expansion of the data structures of each of the plurality of groups of information into the volatile storage medium, those of the setting information in which coincidence is detected by the comparison into the volatile storage medium.

The above object of the invention can be attained also by providing a recording medium having stored thereon an internal information backing up control program for backing up a plurality of information necessary for a firmware, which is incorporated in an electronic device and controls operation of the electronic device, and the internal information backing up control program causes a control means, which controls the backing up of the information, to expand, upon starting of the electronic apparatus, based on the information representative of data structures of each of the plurality of groups of information stored in the firmware and version information at least representative of order of production of the information, the data structures of each of the plurality of information into a volatile storage medium for holding each of the plurality of groups of information each having the same data structures, to compare version information stored in a non-volatile storage medium including holding means for backing up the plurality of information having the same data structures and data structure storage means for storing information representative of the data structures of each of the plurality of setting information of the holding means and version information at least representative of orders of production of the setting information, the data structure storage means and the version information stored in the firmware for each of the plurality of groups of information, and to write, after expanding the data structures of each of the plurality of setting information into the volatile storage medium, those of the setting information, in which coincidence is detected by the comparison, into the volatile storage medium.

In the internal information backing up method of the present invention, information representative of data structures of internal information in the form of binary data delimited in a fixed unit and version information for the individual data structures are stored into tables provided in a firmware and a non-volatile RAM (non-volatile storage medium) in advance, and upon starting of the device, the data structures stored in the table of the replaced firmware are expanded into a RAM (volatile storage medium) so that the data structures prior to the replacement are changed into the new data structures of the replaced firmware.

Thereafter, only those of the internal information in which version information stored in the table of the non-volatile RAM and version information stored in the table of the firmware coincide with each other are written into the RAM. For those of the internal informations in which the version information does not coincide with each other, default values (provisional values) which are written when the data structures are expanded into the RAM are maintained.

Consequently, even if the information form of the internal information is changed or the memory allocation is changed by a change in version of the firmware, the backed up internal information can still be used.

BRIEF DESCRIPTION OF THE DRAWINGS

FIG. 5(*a*) is a diagrammatic view illustrating an example of a change of the memory allocation of internal informations according to the embodiment of the present invention; and FIG. 5(*b*) is a diagrammatic view illustrating an example of a change of the information form of internal information according to an embodiment of the present invention.

DETAILED DESCRIPTION OF THE PREFERRED EMBODIMENTS

Figure 1:
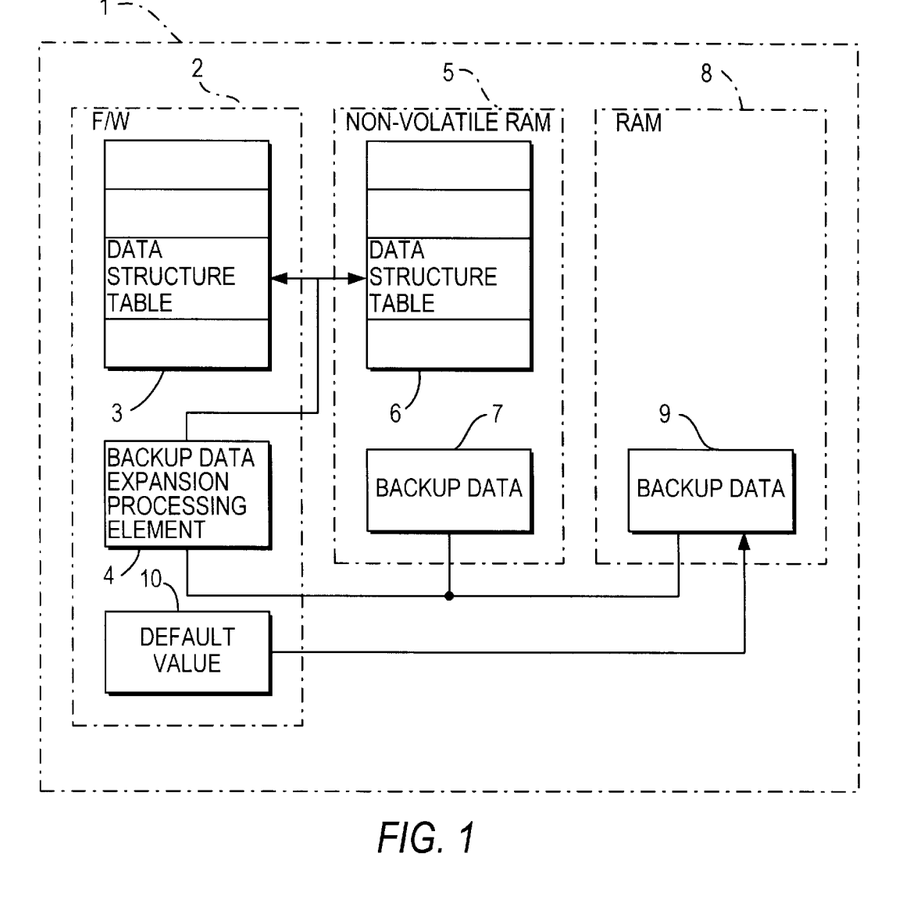
FIG. 1 is a block diagram showing a construction of an embodiment of the present invention.

An embodiment of the present invention is described with reference to the accompanying drawings. FIG. 1 is a block diagram showing a construction of the embodiment of the present invention. Referring to FIG. 1, device (electronic apparatus) 1 includes a firmware (F/W) 2, non-volatile RAM (random access memory) 5, and RAM 8. A non-volatile storage medium may be used in place of non-volatile RAM 5 and a volatile storage medium may be used in place of RAM 8.

Firmware 2 includes a data structure table 3 for storing version information representing the data structure of internal information which is expanded in RAM 8 at the startup of the device (information needed for operation of firmware 2, e.g. route information of input/output and initial value), and the order of production of internal information firmware 2 further includes a backup data expanding unit 4 for expanding backup data of internal information stored in RAM 8 based on the stored contents of the data structure table 3, and a default value storage unit 10 for storing beforehand default values (or provisional values). It is to be noted that the firmware 2 operates based on a program read out from a main storage device or an external store (not shown) and internal information stored in RAM 8.

The non-volatile RAM 5 includes a data structure table 6 for storing, when firmware 2 is to be replaced, version information representing the data structure of internal information that is expanded in RAM 8 prior to the replacement of firmware 2 and for storing the order of production of internal data. Non-volatile RAM 5 further includes a backup data element 7 for backing up backup data expanded in RAM 8. RAM 8 includes a backup data element 9, in which internal information is expanded.

Figure 2:
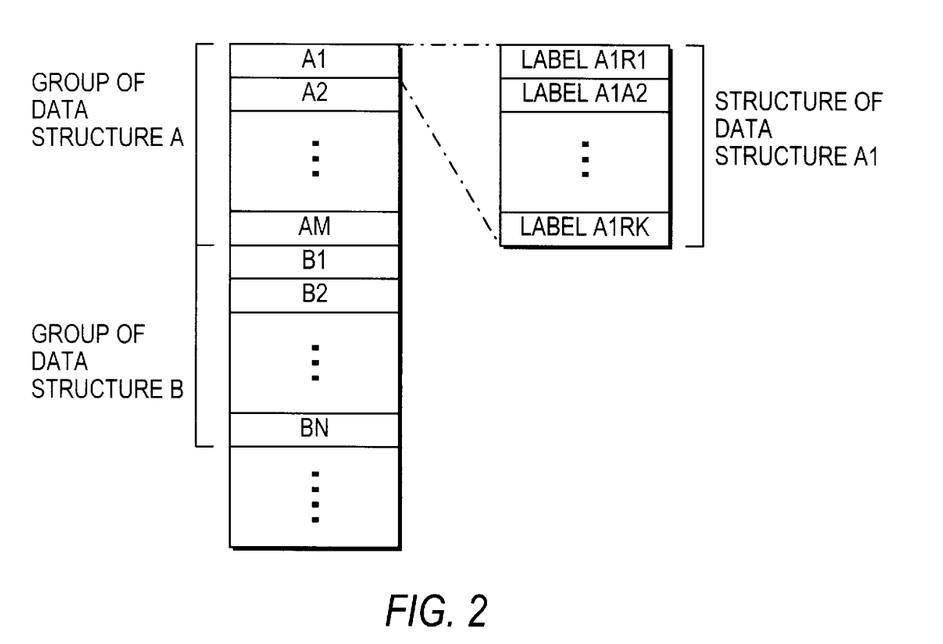
FIG. 2 is a diagrammatic view showing a construction of a backup data element of FIG. 1.

FIG. 2 is a diagrammatic view showing a construction of backup data elements 7 and 9 of FIG. 1. Referring to FIG. 2, in each of backup data elements 7 and 9, internal information is stored in lumps for entities of data having the same data structures, in short, in the form of binary data delimited for each fixed unit. For example, a group of data structures A includes entities A1 to Am of data stored in a lump, and another group of data structures B includes entities B1 to Bn of data stored in a lump.

Here, the internal information represents set values necessary for operation of device 1 and is information needed to restore a condition of device 1 before the power supply is turned off, when the power supply to device 1 is turned off once and then turned on again.

Further, the entity of each data is formed from a plurality of labels. For example, entity A1 of data in the group of data structures A is formed from labels A1R1 to A1Rk. A label indicates a name applied to a package. For example, when 10 packages are mounted in a certain device, a name is given to each of the 10 packages. In this instance, the structure of information that each package has is defined by a data structure while the type of the data is defined by the label, and the entity of the label represents values of data when the data structure is applied to the actual device.

Figure 3:
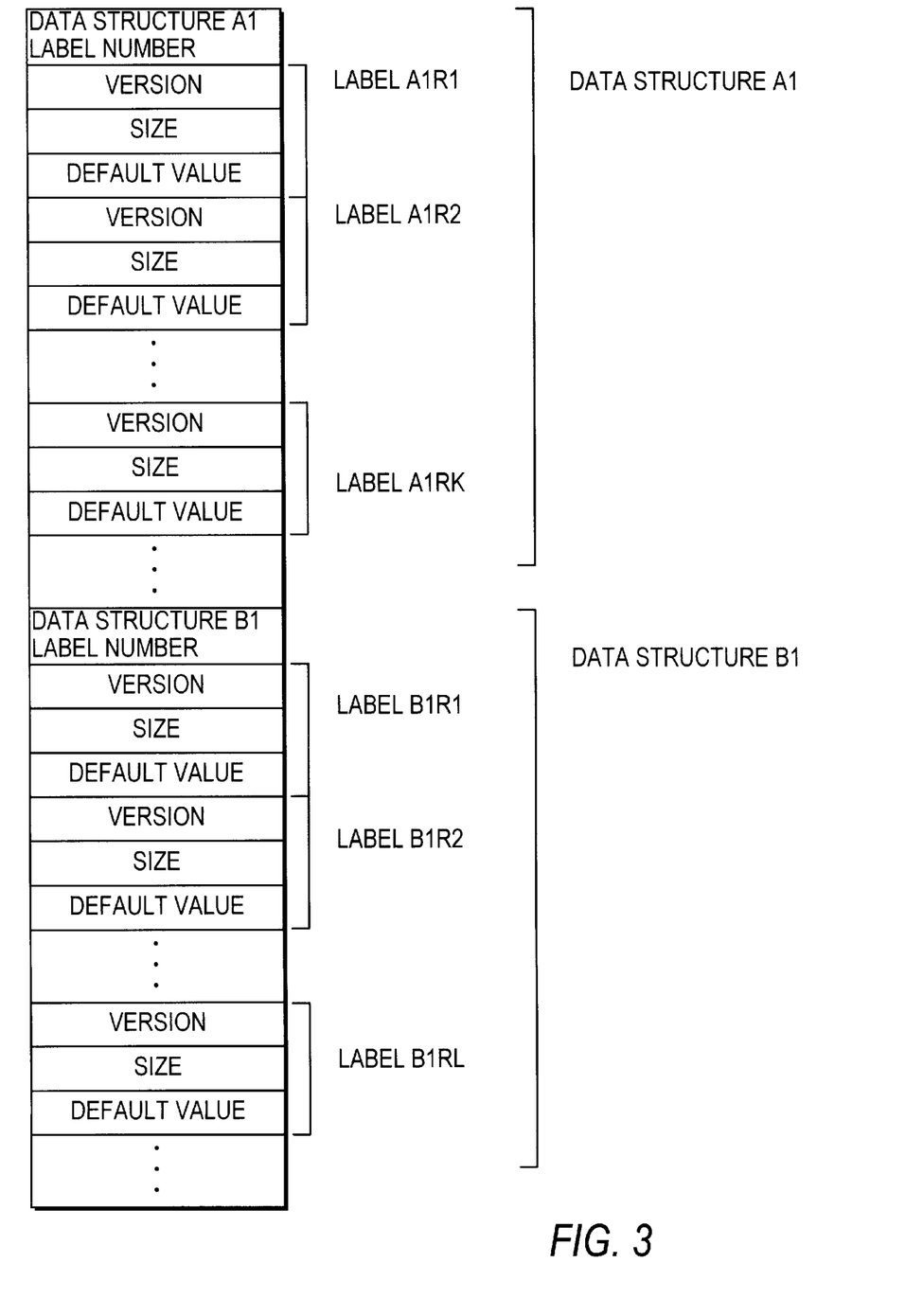
FIG. 3 is a diagrammatic view showing a construction of a data structure table of FIG. 1.

FIG. 3 is a diagrammatic view showing a construction of data structure table 6 of FIG. 1. Referring to FIG. 3, data structure table 6 is composed of versions (indicating orders of production), sizes (memory sizes when expanded) and default values (provisional values) of labels A1R1 to A1Rk, . . . , B1R1 to B1R1, . . . of entities A1 to Am, B1 to Bn, . . . of the data of data structures A, B, . . . , and has label numbers for individual entities A1 to Am, B1 to Bn, . . . of the data of data structures A, B, . . . as information.

Figure 4:
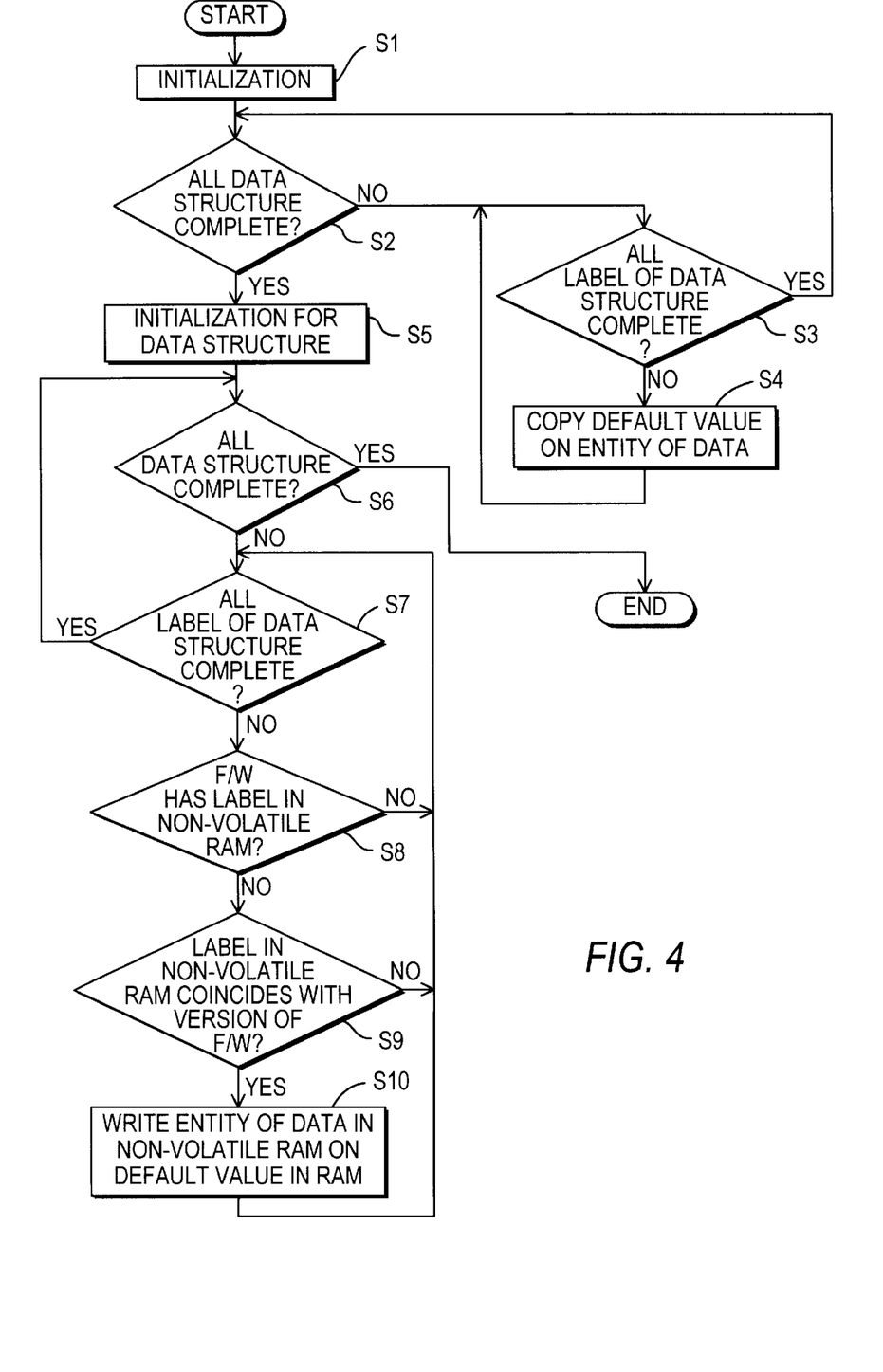
FIG. 4 is a flow chart illustrating a processing operation of a backup data expansion processing element of FIG. 1.
Figure 5A:
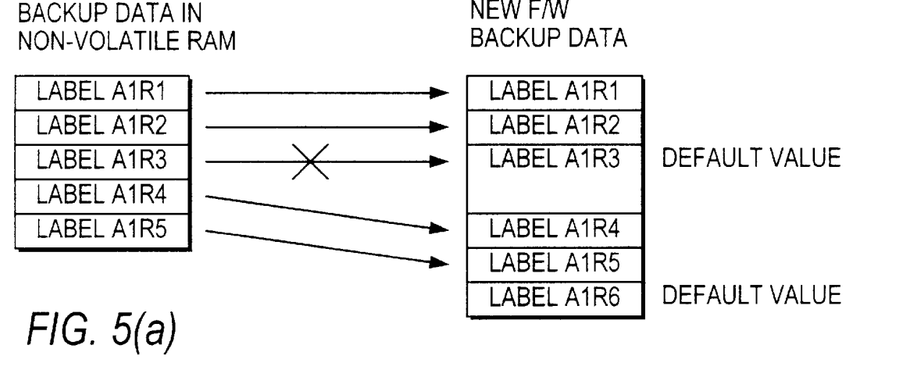
Figure 5B:
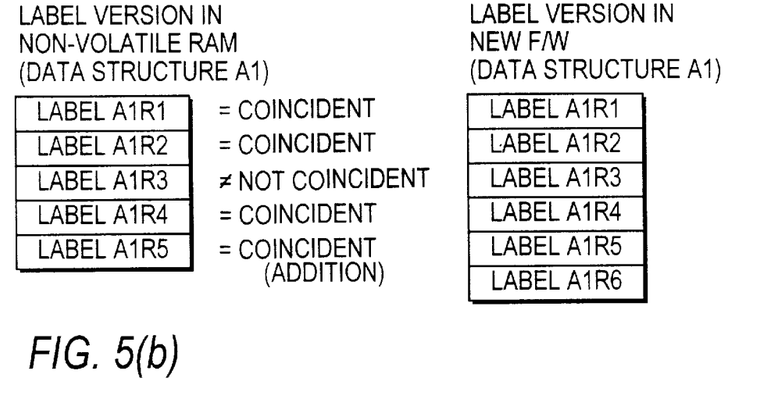

FIG. 4 is a flow chart illustrating the processing operation of the backup data expansion processing element 4 of FIG. 1. FIG. 5(*a*) is a diagrammatic view illustrating an example of a change of the memory allocation of internal information according to an embodiment of the present invention. FIG. 5(*b*) is a diagrammatic view illustrating an example of a change of the information form of internal information according to an embodiment of the present invention. Operation of the embodiment of the present invention is described with reference to FIGS. 1 to 5(*b*).

When firmware 2 is started and the form of the backup data of firmware 2 has been changed by a change in version of the firmware, backup data expansion processing element 4 of firmware 2 starts an initialization operation (step S1 of FIG. 4) and expands, based on the stored contents of data structure table 3, all of the labels of data structures A, B, . . . of data structure table 3 into backup data element 9 of RAM 8 (steps S2 to S4 of FIG. 4). Upon expansion of the data structures, the default values of default value storage element 10 are used for individual entities A1 to Am, B1 to Bn, . . . of the data.

Then, backup data expansion processing element 4 resets its initial operation (step S5) and compares a version of data structure table 3 of firmware 2 with a corresponding version of data structure table 6 in non-volatile RAM 5 (version of a data structure of backup data element 7) (step S9 of FIG. 4).

Backup data expansion processing element 4 expands, if the versions coincide with each other, the backup data of backup data element 7, as it is, into RAM 8 (step S10). But if the versions do not coincide with each other, then backup data expansion processing element 4 maintains the corresponding default value of default value storage element 10. Backup data expansion processing element 4 repeatedly executes the processing described above for individual labels A1R1 to A1Rk, . . . , B1R1 to B1R1, . . . of entities A1 to Am, B1 to Bn, . . . of the data of data structures A, B, . . . (steps S6 to S10 in FIG. 4).

After the expansion of all of the backup data into RAM 8 is completed, backup data expansion processing element 4 returns the backup data expanded in RAM 8 into backup data element 7 in non-volatile RAM 5 in which the backup data had been stored initially, and copies the stored contents of data structure table 3 in firmware 2 into data structure table 6 in non-volatile RAM 5.

When firmware 2 is started the next time, since the contents in the element 7 have been updated to the data structure of firmware 2, correction of the backup data is not required.

FIGS. 5(*a*) and 5(*b*) illustrate the operation of device 1 where, in backup data element 7 in non-volatile RAM 5, entity A1 of the data of data structure A is composed of labels A1R1 to A1R5. In this example, the information form of label A1R3, among labels A1R1 to A1R5, is changed, and label A1R6 is added.

In this instance, the default values of default value storage element 10 are first written by the processing operation described above into backup data element 9 of RAM 8 where the data structures of new firmware 2 are to be expanded.

Then, since the versions of labels A1R1, A1R2, A1R4 and A1R5 in new firmware 2 and the versions of these labels in data structure table 6 in non-volatile RAM 5 are coincident with each other, the backup data of backup data element 7 in non-volatile RAM 5 is overwritten into the respective default values.

Since the version of label A1R3 in new firmware 2 does not coincide with the version in data structure table 6 in non-volatile RAM 5, the default value is maintained. Since information of label A1R6 is not included in data structure table 6 in non-volatile RAMS. a default value is maintained for this label. In this instance, in the memory allocation of labels A1R4 to A1R6 are allocated following label A1R3 whose size has been changed.

In summary, information representative of data structures of internal information of the binary form delimited in a fixed unit and versions of the individual data structures are stored into data structure tables 3 and 6 provided in firmware 2 and non-volatile RAM 5, respectively. Backup data expansion processing element 4 expands the data structures stored in data structure table 3 of exchanged firmware 2 upon starting up of device 1. Thereafter internal information is written into RAM 8 only when the version in data structure table 3 of firmware 2 and the version in data structure table 6 of non-volatile RAM 5 coincide with each other. The default value of internal information is maintained as described above when the versions do not coincide with each other. In this way, the data structure can be corrected automatically in accordance with the version of the internal information thereof. Consequently, even if the information form of internal information is changed or the memory allocation is changed by a change in version of firmware 2, the backed up internal information can be used.

In the following, another embodiment of a backing up of the present invention is described.

The present embodiment is an internal information backing up device for backing up a plurality of pieces of information necessary for a firmware. The embodiment is incorporated in an electronic device and controls operation of the electronic device. The device comprises a non-volatile storage medium including a holding section for backing up the plurality of groups of information, each having the same data structure. A data structure storage stores information representative of the data structures of each of the plurality of groups of information of the holding section and stores version information that is at least representative of the order of production of the information. A volatile storage medium holds the plurality of groups of information, each having the same data structure. A data structure table is disposed in the firmware for storing the information representative of the data structures of each of the plurality of groups of information and stores the version information representative of at least the order of production of the information of the volatile storage medium. An expansion unit expands the data structures of each of the plurality of groups of information into the volatile storage medium based on the stored contents of the data structure table when the electronic device is started. A comparator compares the version information stored in the data structure storage of the non-volatile storage medium and the version information stored in the data structure table with each other for each of the plurality of groups of information. A writing means which, after the expansion of the data structures of each of the plurality of groups of information into the volatile storage medium by the expansion unit is completed, writes those pieces of informations in which coincidence is detected by the comparator into the volatile storage medium.

The present embodiment may be constructed such that it further comprises a storage disposed in the firmware for storing provisional values of the setting information in advance. This information is used when the expansion unit expands the data structures of each of the plurality of groups of information into the volatile storage medium, and the provisional values stored in the storage means are written into the volatile storage medium.

Further, the present embodiment may be constructed such that it further comprises an updating means for updating the stored contents of the holding section of the non-volatile storage medium using the stored contents of the volatile storage medium and for updating the stored contents of the data structure storage of the non-volatile storage medium using the stored contents of the data structure table. These updates are performed when coincidence has been detected by the comparator and after writing into the volatile storage medium has been completed.

Now, another embodiment of the present invention is described.

The present embodiment is an internal information backing up method for backing up a plurality of setting information required to operate firmware. The method is incorporated in an electronic device and controls operation of the electronic apparatus. The method comprises expanding the data structures of each of the plurality of groups of information into a volatile storage medium so as to hold each of the plurality of groups of information having the same data structures. This is performed when the electronic apparatus is started, based on information representative of data structures of each of the plurality of pieces of information stored in the firmware and version information representative of at least the order of production of the setting information. The method then further compares version information in a data structure storage of a non-volatile storage medium including a holding section for backing up the plurality of groups of information having the same data structures and a data structure storage for storing information representative of the data structures of each of the plurality of groups of information of the holding section and version information representative of at least the order of production of the information, with the version information stored in the firmware for each of the plurality of groups of information. After the expansion of the data structures of each of the plurality of groups of into the volatile storage medium, the method then writes those pieces of information in which coincidence is detected by the comparison, into the volatile storage medium. In the act of expanding the data structures of each of the plurality of pieces of information, provisional values of the setting informations stored in advance in the firmware may be written into the volatile storage medium when the data structures of the plurality of pieces of information are expanded into the volatile storage medium. Further, the present method may further comprise a step, in which, after the writing of the information into the volatile storage medium is completed, the stored contents of the holding section of the non-volatile storage medium are updated using the stored contents of the volatile storage medium and the stored contents of the data structure storage of the non-volatile storage medium are updated using the contents stored in the firmware.

Next, yet another embodiment of a storage medium of the present invention is described.

The present embodiment is a storage medium storing thereon an internal information backing up control program for backing up a plurality of pieces of internal information necessary for a firmware. The storage medium is incorporated in an electronic device and controls operation of the electronic device. The internal information backing up control program causes a controller, which controls the backing up of the information, to expand the data structures of each of the plurality of groups of information into a volatile storage medium that holds each of the plurality of groups of information having the same data structures. The expansion is performed when the electronic apparatus is started, based on information representative of data structures of each of the plurality of groups of information stored in the firmware and based on version information representative of at least the order of production of the setting information. The backup control program causes the control means to compare version information stored in the data structure storage of a non-volatile storage medium including a holding section for backing up the plurality of groups of information having the same data structures and the data structure storage for storing information representative of the data structures of each of the plurality of pieces of information of the holding section and version information representative of at least the order of production of the information with the version information stored in the firmware for each of the plurality of setting information. The backup control program causes the control means to write, into the volatile storage medium those pieces of the setting information in which coincidence is detected by the comparison after the expansion of the data structures of each of the plurality of groups of information into the volatile storage medium. Further, in the storage medium, the internal information backing up control program may cause the control means to write provisional values of the information stored in advance in the firmware into the volatile storage medium when the data structures of the plurality of information are expanded into the volatile storage medium. Furthermore, the internal information backing up control program may cause the control means to update, after the writing of the setting information, into the volatile storage medium is completed, the stored contents of the holding section of the non-volatile storage medium using the stored contents of the volatile storage medium and to update the stored contents of the data structure storage of the non-volatile storage medium using the stored contents stored in the firmware.

As described above, according to the present invention, upon starting of an electronic device, based on information representative of data structures of each of a plurality of groups of information stored in a firmware and version information representative of at least an order of production of the setting information, the data structures of each of the plurality of groups of information are expanded into a volatile storage medium for holding each of the plurality of groups of information having the same data structures and then version information stored in a data structure storage of a non-volatile storage medium including a holding section for backing up the plurality of groups of information having the same data structures and a data structure storage for storing information representative of the data structures of each of the plurality of groups of information of the holding section and version information representative of at least an order of production of the information, and the version information stored in the firmware are compared with each other for each of the plurality of groups of informations. Thereafter those of the pieces of information in which coincidence is detected by the comparison are written into the volatile storage medium after the expansion of the data structures of each of the plurality of groups of informations into the volatile storage medium is completed. Hence even if the information form of the setting information is changed or the memory allocation is changed by a change in version of the firmware, the data structures can be corrected automatically.

What is claimed is:

1. An internal information backing up device for backing up internal information used by a firmware to facilitate a re-start and operation of an electronic apparatus after said electronic apparatus has been turned off and then on, said firmware being incorporated into said electronic apparatus, said internal information being organized into a plurality of groups of information entities, each information entity including at least one label, each respective label including at least version information indicating the version of said respective label, said firmware controlling the operation of said electronic apparatus and including a data structure table which stores current labels having current data, said internal information backing up device comprising:

a first non-volatile storage medium including a backup section which stores said plurality of groups of information entities relating to data that exists in said non-volatile storage medium before said electronic apparatus is turned off and on, said non-volatile storage medium further including a data structure storage section which stores prior labels, said prior labels including data that exists in said prior labels before said electronic apparatus is turned off and on;

a second storage medium;

a comparator which compares said version information stored in said data structure storage section of said non-volatile storage medium for each prior label and said version information stored in said data structure table of said firmware for each corresponding current label; and an expansion processing unit which expands information entities related to a particular prior label stored in said back-up section into said second storage medium when said version information of said particular prior label matches with said version information of a corresponding current label.

2. An internal information backing up device as claimed in claim 1, further comprising:

a third storage medium which stores provisional values of said information entities and wherein said provisional values stored in said third storage medium are first written into said second storage medium before said expansion processing unit expands said information entities into said second storage medium.

3. An internal information backing up device as claimed in claim 1, wherein after said expansion processing unit expands said information entities, said internal information backing up device further replaces the contents of said backup section of said non-volatile storage medium using the contents of said second storage medium and replaces the contents of said data structure storage section of said non-volatile storage medium using the contents of said data structure table of said firmware.

4. An internal information backing up device as claimed in claim 2, wherein after said expansion processing unit expands said information entities, said internal information backing up device further replaces the contents of said backup section of said non-volatile storage medium using the contents of said second storage medium and replaces the contents of said data structure storage section of said non-volatile storage medium using the contents of said data structure table of said firmware.

5. An method for backing up internal information used by a firmware to facilitate a re-start and operation of an electronic apparatus after said electronic apparatus has been turned off and on, said firmware being incorporated into said electronic apparatus, said internal information being organized into a plurality of groups of information entities, each information entity including at least one label, each respective label including at least version information indicating the version of said respective label, said firmware controlling the operation of said electronic apparatus and including a data structure table which stores current labels having current data, said method comprising the steps of:

storing, in a non-volatile storage medium, prior information entities relating to data that exists in said non-volatile storage medium before said electronic apparatus is turned off and on;

storing, in said non-volatile storage medium, prior labels including data that exists in said prior labels before said apparatus is turned off and on;

comparing said version information in said prior labels stored in said non-volatile storage medium with said version information in said current labels stored in said firmware, for each of the plurality of groups of information entities; and when said comparing indicates that said version information in a particular prior label matches said version information in a corresponding particular current label, writing into another storage medium said information entities relating to said particular prior label.

6. The method as claimed in claim 5, further comprising, before said step of writing, the step of:

storing provisional values of said information entities into said another storage medium.

7. The method as claimed in claim 5, further comprising the step of:

updating, after said step of writing, the contents of said non-volatile storage medium using the contents of said another storage medium and using the contents in said firmware.

8. The method as claimed in claim 6, further comprising the step of:

updating, after said step of writing, the contents of said non-volatile storage medium using the contents of said another storage medium and using the contents in said firmware.

9. A computer readable storage medium containing program data for controlling an internal information backup device for backing up internal information used by a firmware to facilitate a re-start and operation of an electronic apparatus after said electronic apparatus has been turned off and on, said firmware being incorporated into said electronic apparatus, said internal information being organized into a plurality of groups of information entities, each information entity at least one label, each respective label including at least version information indicating the version of said respective label, said firmware controlling the operation of said electronic apparatus and including a data structure table which stores current labels having current data, said program data including the step of:

storing, in a non-volatile storage medium, prior information entities relating to data the exists in said non-volatile storage medium before said electronic apparatus is turned off and on;

storing, in said non-volatile storage medium, prior labels including data that exists in said prior labels before said apparatus is turned off and on;

comparing said version information in said prior labels stored non-volatile storage medium with said version information in said current labels stored in said firmware, for each of the plurality of groups of information entities; and when said comparing indicates that said version information in a particular prior label matches said version information in a corresponding particular current label, writing into another storage medium said information entities relating to said particular prior label.

10. The computer readable storage medium as claimed in claim 9, further comprising program data for performing, before said step of writing, the step of:

storing provisional values of said information entities into said another storage medium.

11. The computer readable storage medium as claimed in claim 10, further comprising program data for performing the step of:

updating, after said step of writing, the contents of said non-volatile storage medium using the contents of said another storage medium and using the contents in said firmware.

12. The computer readable storage medium as claimed in claim 9, further comprising program data for performing the step of:

updating, after said of writing, the contents of said non-volatile storage medium using the contents of said another storage medium and using the contents in said firmware.

* * * * *